United States Patent [19]

Baumgarten

[11] Patent Number: 4,965,907
[45] Date of Patent: Oct. 30, 1990

[54] UTENSIL HAVING A DETACHABLE HANDLE MEMBER

[75] Inventor: Gerd-Diethard Baumgarten, Wilnsdorf-Wilden, Fed. Rep. of Germany

[73] Assignee: Heinrich Baumgarten KG Spezialfabrik fuer Beschlagteile, Neunkirchen, Fed. Rep. of Germany

[21] Appl. No.: 381,076

[22] Filed: Jul. 17, 1989

[51] Int. Cl.⁵ .............................................. B65D 25/28
[52] U.S. Cl. .................... 16/114 A; 16/DIG. 24; 220/94 R
[58] Field of Search ............ 16/114 A, 114 R, 110 A, 16/DIG. 24; 403/230, 353; 220/94 R

[56] References Cited

U.S. PATENT DOCUMENTS

| 945,659 | 1/1910 | Wilson | 16/114 A |
|---|---|---|---|
| 1,277,182 | 8/1918 | Borsse | 16/114 A |
| 1,831,111 | 11/1931 | Hill | 16/114 A |
| 2,024,294 | 12/1935 | Kirsch | 16/114 A |
| 2,075,685 | 3/1937 | Weidemann | 16/114 A |
| 4,565,296 | 1/1986 | Lam | 16/114 A |

*Primary Examiner*—Richard K. Seidel
*Assistant Examiner*—James Miner
*Attorney, Agent, or Firm*—Flynn, Thiel, Boutell & Tanis

[57] ABSTRACT

A utensil having a detachable handle member. The front end portion of the handle member and an associated mounting zone on the utensil have a detachable, matching snap-on device which includes at least one substantially vertical cavity and a corresponding vertical latch component that is adapted to be introduced into the cavity, the latter as well as the latch component being in an upper region of the front end portion of handle member, whereas locking means for detachably connecting the handle member to the utensil are provided in a lower region of the front end portion of handle member.

7 Claims, 1 Drawing Sheet

UTENSIL HAVING A DETACHABLE HANDLE MEMBER

FIELD OF THE INVENTION

The invention relates to a utensil having a detachable handle member.

BACKGROUND OF THE INVENTION

Such utensils or vessels are commonly employed, e.g. by way of cooking pots or pans. The handle member must be affixed to the utensil in such manner that any relative movement therebetween is prevented and that the utensil or vessel may be safely used when filled, too.

In kitchen use, vessels such as frying pans or cooking pots are conventionally put on an oven or range, namely on a hotplate, for heating food. Where food is treated in a microwave oven, it is necessary to have special utensils the structure and design of which must be adapted to microwave requirements. In particular, such utensils must not have projecting parts because of a hazard of jump spark, i.e. electric discharges. Consequently, standard pots and pans cannot be used in a microwave oven. This is of disadvantage in that, on the one hand, it is necessary to acquire special utensils suitable for use in a microwave oven and in that, on the other hand, conventionally treated food which got cold in a standard pot or pan may be heated in a microwave oven only after transfer into a special utensil suitable for the purpose.

It is an important object of the invention to provide a vessel or utensil which can be used both on a conventional oven or hotplate and in a microwave oven.

A principal feature of the invention is that at a front end portion of the handle member facing the utensil and at an associated mounting zone on the utensil, there is a detachable, matching snap-on device comprising at least one substantially vertical cavity and a corresponding vertical latch component that is adapted to be introduced into the cavity, the latter as well as the latch component being in an upper region of the front end portion of the handle member, whereas locking means for detachably connecting the handle member to the utensil are provided in a lower region of the front end portion of the handle member.

The utensil or vessel according to the invention is distinguished by a number of considerable advantages. Due to the possibility of detaching the handle member from the utensil, it can be employed in a microwave oven without any hazard of jump sparks or other operational failures. The detachable snap-on device permits joining the handle member to the utensil for conventional use such that the filled vessel, too, can be safely handled. Owing to the cavity and to the latching component that can be introduced therein, an economic way of manufacturing is possible. Moreover the design warrants a maximum of operational reliability, as even a less skillful person will properly attach the handle member since improper snapping-on is automatically avoided. The locking means according to the invention permits a strong connection to the utensil but easy detachment therefrom as well. Thus no tools or implements will be required for detaching the handle member from the utensil or for attaching it thereto. Further in accordance with the invention, the snap-on device may be dimensioned such that particular electric safety is obtained, especially in an arrangement whereby the snap-on device will project or protrude from the outer wall of the utensil less than other parts thereof, e.g. its upper rim or collar.

An advantageous embodiment of the invention is characterized in that the cavity is provided at the utensil and the latch component is on the handle member. This design permits arranging the more voluminous portions as well as parts of the latching means on the handle member which, as it is not used in a microwave oven, is not subject to restrictions in respect of projecting portions that require more space.

Special advantages are obtained by an embodiment wherein an outer wall of the utensil bears a frame closed in itself and provided with the cavity by way of a bulging portion that is spaced from the outer wall of the utensil. Favorable is also a design wherein the latch component comprises a tongue that projects upwardly from the front end portion of the handle member and is adapted to be introduced into the bulging portion of the frame. The latter can be quite flat so as to be very close to the outer wall of the vessel, which will be beneficial as to electrophysical effects during microwave operations. Other advantages are that the frame will not detract visually and that it may be provided within normal manufacturing procedures of the utensil. It may be mentioned here that the frame according to the invention permits polishing and cleaning the outer wall of the utensil after its inner surface has been coated, whereby the frame will not impede any automatic procedures for treating the surface and polishing it. Since the tongue provided at the handle member need have only a very small thickness, so that it may e.g. be made of sheet metal, the bulging portion of the frame can be designed in accordance with the invention such that it will protrude from the utensil outer wall only by a small margin. It is thus possible to restrict the enlargement of the utensil diameter caused by the mounting of the frame to an absolute minimum.

Preferably, the frame is directly welded to the utensil, e.g. by spot welding, and there may be some small distance of the non-welded frame portions to the utensil surface so that heat insulation is warranted once the handle member is attached.

Especially advantageous is an embodiment wherein a lower region of the frame is provided with a locking bulge adapted to receive a shackle that is movably arranged on the handle member. The design of the locking bulge may resemble that of the bulging portion for receiving the tongue on the handle member, whereby the locking bulge, too, will only protrude slightly from the outer wall of the utensil. Moreover, the shackle movably arranged on the handle member may be made as a strip of sheet metal so that manufacture is both simple and economical. In respect of the bulging of the frame, the shackle will also require merely a small space.

It will further be of advantage if the shackle is pretensioned and forms, with the locking bulge, a snap-action fixing means. Owing to such structure of the shackle it will not be necessary to operate it separately in order to attain secure locking of the handle member; rather, it will do to hook the upwardly directed tongue of the handle member under the bulging portion of the frame and to press the handle member towards the utensil. The yielding shackle will then snap in the locking bulge of the frame, whereby the handle member is securely connected to the utensil.

According to another favorable design, the shackle may comprise an operating tab in order to permit the operator to pull or swivel the shackle out of the locking bulge for detaching the handle member from the utensil. It will be noted that the size and location of the operating tab are irrelevant with regard to the use of the utensil in a microwave oven since, as mentioned above, the handle member will not be employed therein.

Expediently, the tongue may extend over the total width of the handle member and may be of equal width as the bulging portion. In such configuration, it is assured that the tongue fits the bulging portion of the frame so that any relative movement between the handle member and the utensil is effectively prevented.

By a further advantageous embodiment of the invention, the handle member has, at its front end portion, lateral support shoes adapted to engage the outer wall of the utensil and/or the frame. It may be particularly favorable if these support shoes are dimensioned such that they will fit the inner volume confined by the frame so that any turning of the handle member relative to the utensil is prevented. The support shoes, therefore, serve not only for load transmission but also to prevent any turning or twisting of the handle member.

It is possible that the support shoes as well as the upwardly directed tongue of the handle member are integral to form a plate element that is joined to the handle member, e.g. by means of welding.

BRIEF DESCRIPTION OF THE DRAWINGS

The invention will now be described by way of an exemplary embodiment with reference to the accompanying drawing, wherein.

DETAILED DESCRIPTION

Figure 1:
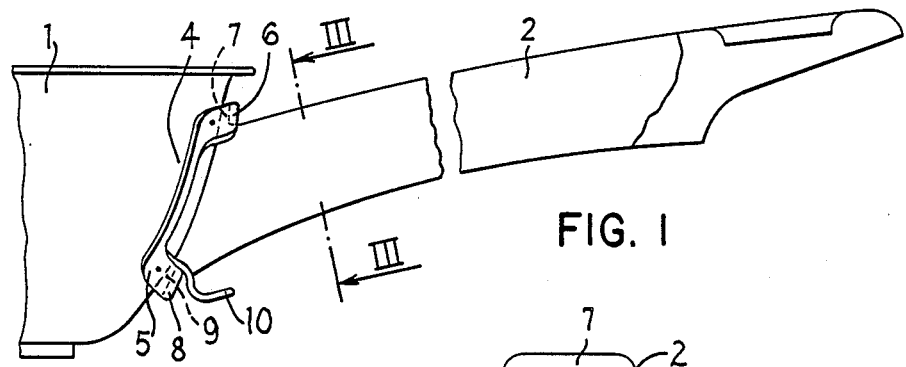
FIG. 1 is a fragmentary side elevational view of a utensil and handle member according to the invention.
Figure 4:
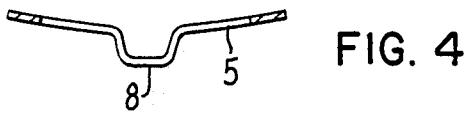
FIG. 4 is a sectional view taken along line IV—IV of FIG. 2.

Generally, the side elevation of FIG. 1 shows a part of a utensil 1 that may, for example, be designed as a frying pan. A handle member 2, shaped as a shaft handle for a frying pan, is connected to the utensil 1 which is, at a mounting zone 4, provided with a frame 5. The latter will be dealt with in more detail below, with reference especially to FIGS. 2, 4 and 5.

Figure 2:
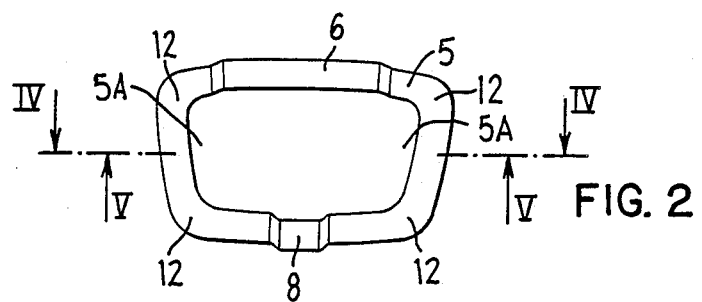
FIG. 2 is a frontal view of a frame according to the invention.

The handle member 2 is detachably connected to the frame 5 as shown in FIG. 1. A frontal view of the frame 5 is seen in FIG. 2. In the embodiment discussed here, the frame 5 is made of sheet metal and may be closed to form a substantially rectangular confine. It will be evident from FIGS. 4, 5 and 1 that the frame 5 is curved in itself such that it closely follows the outer contour of the utensil 1. The frame 5 is joined to the utensil 1 as for example by spot welding; four welding spots 12 may be provided for the purpose.

Figure 5:
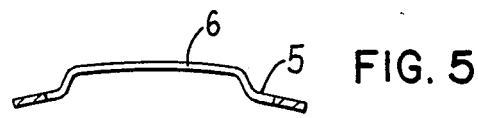
FIG. 5 is a sectional view taken along line V—V of FIG. 2.

In an upper region of the frame 5, namely, the part that extends essentially in a horizontal direction, the frame 5 includes a bulging portion 6 which occupies a major part of the width of the frame 5 and which is arranged at a constant small distance from the wall of utensil 1, as will be noted from FIG. 5. Further, the substantially horizontal lower region of frame 5 is provided with a locking bulge 8 also extending in a spaced relation from the utensil wall and forming, just as the bulging portion 6, a spacing volume or cavity between the frame 5 and the utensil 1.

Figure 3:
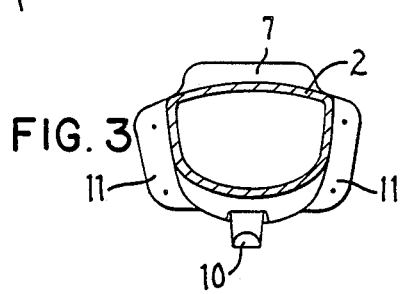
FIG. 3 is a sectional view taken along line III—III of FIG. 1.

The sectional view of FIG. 3 shows the handle member 2 of the invention in a position detached from the utensil 1 for purposes of clarity. The handle member 2 is essentially of a tubular or rectangular cross section and may be made of metal shaped as a hollow tube. At its end facing the utensil 1, hereinafter referred to as the front end, handle member 2 has a tongue 7 that extends substantially vertical (relative to the position of utensil 1 shown in FIG. 1) and that is essentially as wide as the handle member 2. The tongue 7 is designed as a sheet metal strip and is vertically about as high as the frame 5 is wide. The tongue 7 thus is dimensioned so as to permit introduction into the cavity formed by the bulging portion 6 between the frame 5 and the utensil 1. As shown in FIG. 1, the tongue 7 is hooked into the cavity formed by the bulging portion 6 from the underside of the bulging portion 6 in order to facilitate a joining of the handle member 2 to the utensil 1.

In its lower region, the front end portion of the handle member 2 includes a shackle 9 that is elastically or movably provided on the handle member 2 and that may be introduced into the locking bulge 8 after the tongue 7 has been inserted into the cavity formed by the bulging portion 6. In the position shown in FIG. 1, where the handle member 2 is attached to the utensil 1, the tongue 7 is positively connected to the frame 5 in the bulging portion 6 and, in addition, the shackle 9 is introduced into locking bulge 8. The shackle 9 comprises an operating tab 10 of such design and dimensions that the shackle 9 is pulled out of the locking bulge 8 as the operating tab 10 is pressed upwardly. In this way it is possible to detach the handle member 2 from the utensil 1, starting from the position shown in FIG. 1.

It will become evident from FIG. 3 that the handle member 2 includes lateral support shoes 11 which likewise may be made of sheet metal. The support shoes 11 may be integral with the tongue 7; however, it is also envisaged to integrally combine the support shoes 11 as well as the tongue 7 with the handle member 2 if the latter is a bent sheet metal part.

The support shoes 11 are curved in themselves such that they conform to the shape of the outer wall of the utensil 1 as indicated in FIG. 1. Expediently, the support shoes 11 are dimensioned such that they may be introduced into the free spaces 5A of the frame 5 (see FIG. 1). In this way, a positive connection is effected that serves to prevent any turning or twisting of the handle member 2 relative to the frame 5. If the support shoes 11 are made of sheet metal of equal thickness as the frame 5, it is furthermore possible to create an aesthetic design of the utensil with handle member 2 attached thereto.

By spring means (not shown) or a similar device, the shackle 9 movably arranged on handle member 2 and operating tab 10 operatively associated therewith may be pretensioned towards the position shown in FIG. 1. However, it is also possible to employ a shackle 9 that is elastic in itself and to dimension and arrange it such that the shackle 9 will be biassed towards the position of FIG. 1 whereby it protrudes from the handle member 2. Moreover, the shackle 9 may be provided with an inclined or skewed portion in order to permit automatic locking of the shackle 9 in the locking bulge 8 as the handle member 2 is pressed onto the utensil 1.

The invention is not to be restricted to the particular embodiment shown and described. Rather, the scope of the invention comprises many variations and modifications, especially with regard to the dimensions and design of the frame affixed to the utensil or vessel.

The embodiments of the invention in which an exclusive property or privilege is claimed are defined as follows:

1. A utensil having a detachable handle member, comprising a closed ring which is secured to said utensil and which has on opposite sides thereof first and second cavities, said first cavity being vertically higher than said second cavity, and first and second members on said handle member which are respectively releasably engageable with said first and second cavities, one of said first and second members being a tongue, and the other thereof having a movable locking portion and means for yieldably resisting movement of said locking portion out of one of said cavities.

2. The utensil according to claim 1, wherein said ring is made from sheet metal, and is disposed directly against a surface of said utensil all along said ring except at first and second portions thereof, said first and second portions being bent to be spaced from said surface, and said first and second cavities being the regions between said surface and said first and second portions, respectively.

3. The utensil according to claim 2, wherein said handle has sheet metal support portions which project outwardly in opposite directions and which each have an outer edge portion disposed in contact with a congruent inner edge portion provided on said ring.

4. The utensil according to claim 3, wherein said handle is a sheet metal tube, and said support portions and said first and second members are each bent portions of said tube.

5. The utensil according to claim 2, wherein said ring is spot welded to said utensil.

6. The utensil according to claim 2, wherein said tongue extends over the total width of said handle member, is engageable with said first portion of said ring, and is of equal width to said first portion.

7. The utensil according to claim 1, wherein first member is said tongue and said second member includes said locking portion, said means for yieldably resisting including said second member having a degree of inherent resilience.

* * * * *